US010548292B2

(12) United States Patent
Daerr

(10) Patent No.: US 10,548,292 B2
(45) Date of Patent: Feb. 4, 2020

(54) PORTABLE PET RUN

(71) Applicant: Jordan Daerr, Wichita, KS (US)

(72) Inventor: Jordan Daerr, Wichita, KS (US)

(*) Notice: Subject to any disclaimer, the term of this patent is extended or adjusted under 35 U.S.C. 154(b) by 117 days.

(21) Appl. No.: 15/867,588

(22) Filed: Jan. 10, 2018

(65) Prior Publication Data

US 2019/0208743 A1    Jul. 11, 2019

(51) Int. Cl.
*A01K 1/04* (2006.01)
*A01K 3/00* (2006.01)

(52) U.S. Cl.
CPC . *A01K 1/04* (2013.01); *A01K 3/00* (2013.01)

(58) Field of Classification Search
CPC ..................................... A01K 1/04; A01K 3/00
See application file for complete search history.

(56) References Cited

U.S. PATENT DOCUMENTS

| 4,486,953 A * | 12/1984 | Halverson ............... B27B 17/02 30/385 |
| 5,080,045 A * | 1/1992 | Reese .................. A01K 27/005 119/770 |
| 10,143,184 B1 * | 12/2018 | Lane ....................... A01K 27/00 |
| 2010/0089338 A1 * | 4/2010 | Stern ..................... A47D 13/086 119/770 |
| 2015/0013619 A1 * | 1/2015 | Kahana, Jr. .............. A01K 1/04 119/770 |
| 2015/0096501 A1 * | 4/2015 | Monk ...................... A01K 1/04 119/769 |

OTHER PUBLICATIONS

Cylinder definition; WolframMathWorld; http://mathworld.wolfram.com/Cylinder.html; accessed Jun. 21, 2019. (Year: 2019).*

* cited by examiner

*Primary Examiner* — Daniel J Colilla
(74) *Attorney, Agent, or Firm* — Mark S Hubert

(57) ABSTRACT

The present invention relates to a novel design for a lightweight, portable D shaped circular dog run that is adapted for quick and simple attachment to a plethora of different diameter vertical stanchions including but not limited to posts, trees, pillars, poles and the like. It has a simple configuration wherein its distal end is insert able within its proximal end to an adjustable depth and then pinned therein, so as to create a continuous ring with a central void that accepts a spherical end of a track sphere. The track sphere rotates around the D shaped run within its central void and having a linear member extending normally therefrom with a lead ring on its end that the leash of the pet can be affixed to.

7 Claims, 9 Drawing Sheets

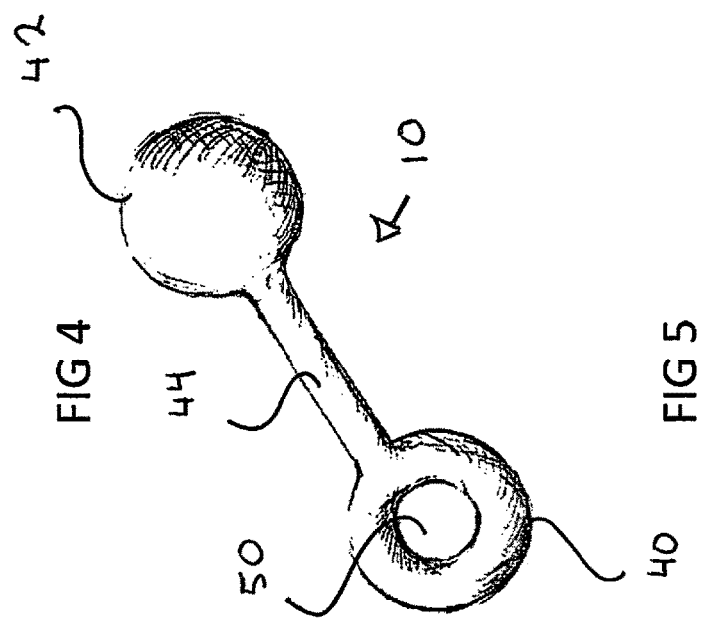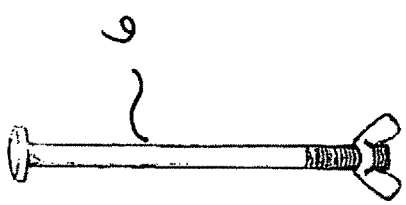

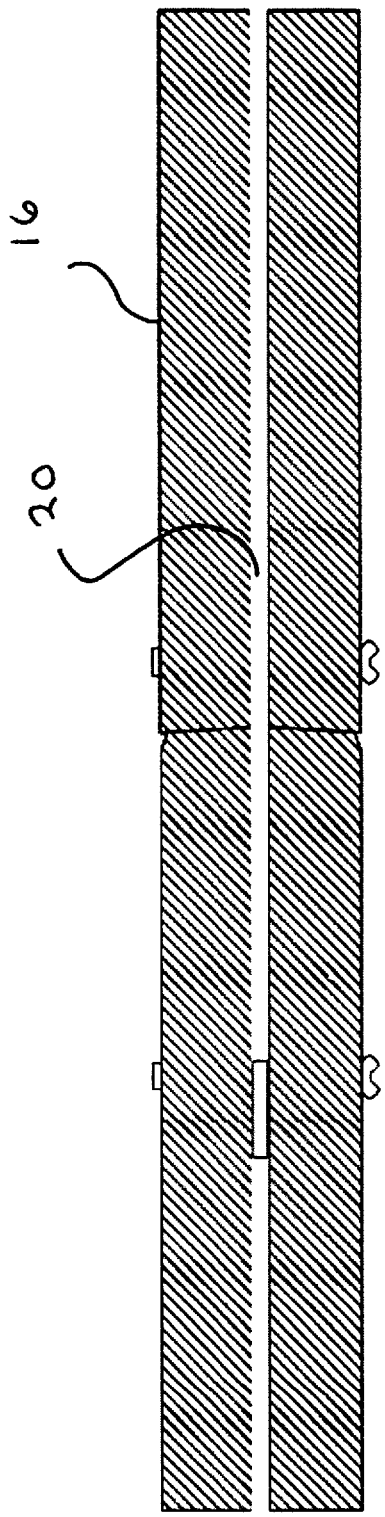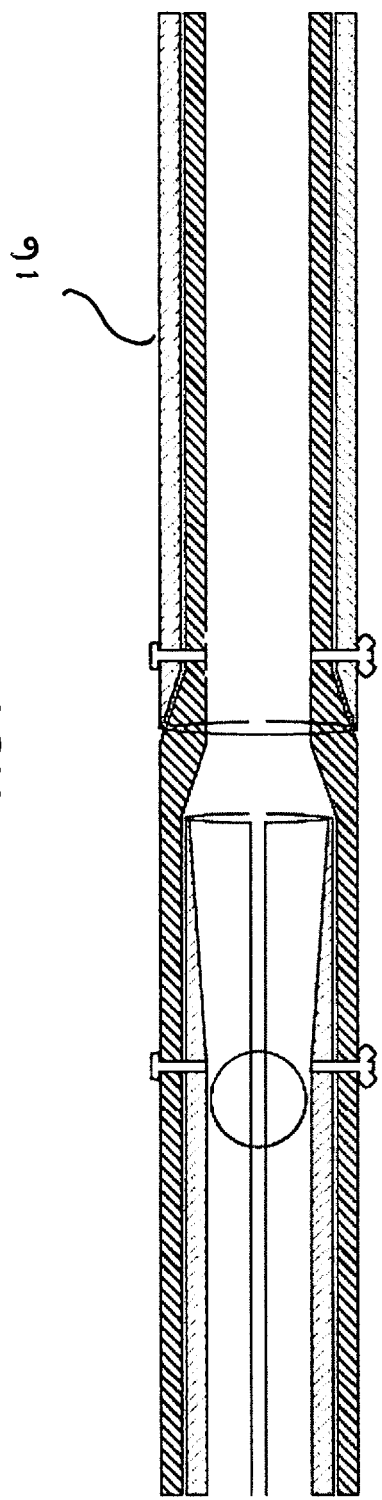

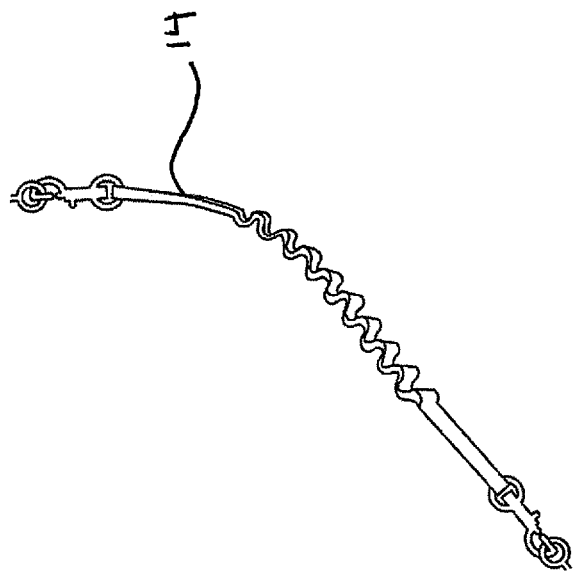

PORTABLE PET RUN

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to pets, and more particularly to a device to eliminate the tangling of pet leashes and eliminate the need for a space consuming pet run.

BACKGROUND

Americans love their animals. Now more than ever have dogs in particular, been integrated into the human social environment. No longer do dogs remain at home when their owners venture out. Dogs are common place in stores, bars, restaurants, outdoor cafes, dog parks, and the like. People take man's best friend almost everywhere they go now days. However, there is still a need to constrain their pets when going into an area that does not allow dogs. Generally, pet owners loop their pet's leashes around a post, bike rack, tree or any handy stationary anchor. Unfortunately, many dogs do not fair well when their owner's depart. Their anxieties rise and they pace, twist, spin and push the extent of their leashes. As the animal goes through their physical gyrations, they tangle and shorten their leashes leaving the animal tightly bound, and often defenseless.

Caged dog runs solve this problem as well as overhead run lines but both of these require space and time to erect. This is not practical unless provided by the establishment the pet's owner frequents. Henceforth, an improved method of temporarily constraining a dog such that their leash or lead does not tangle would fulfill a long felt need for pet owners. This new invention utilizes and combines known and new technologies in a unique and novel configuration to overcome the aforementioned problems and accomplish this.

BRIEF SUMMARY

In accordance with various embodiments, a system, apparatus, and method for constraining a pet while allowing them unhampered freedom of movement is provided.

In one aspect, a small, portable pet run capable of installation around any stationary vertical stanchion, configured to eliminate the animal from tangling their leash is provided.

In another aspect, a portable pet run is provided, capable of affixation to a range of different diameters of vertical stanchions and adapted for all sizes of pets.

In yet another aspect, a lightweight resilient dog run is provided capable of setup by any size and strength pet owner.

In yet another aspect, a small physical profile dog run that is suited for use in the city or country using any form of vertical stanchion such as a post or tree is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 4 is a perspective side view of the lead anchor;

FIG. 5 is a perspective view of the mechanical fastener;

FIG. 6 is a partial side view of the portable pet run across the connection region;

FIG. 7 is a is a cross sectional, partial front side view of the partially inserted portable pet run across the connection region;

FIG. 13 is a perspective view of an optional elastic leash.

DETAILED DESCRIPTION OF CERTAIN EMBODIMENTS

Figure 1:
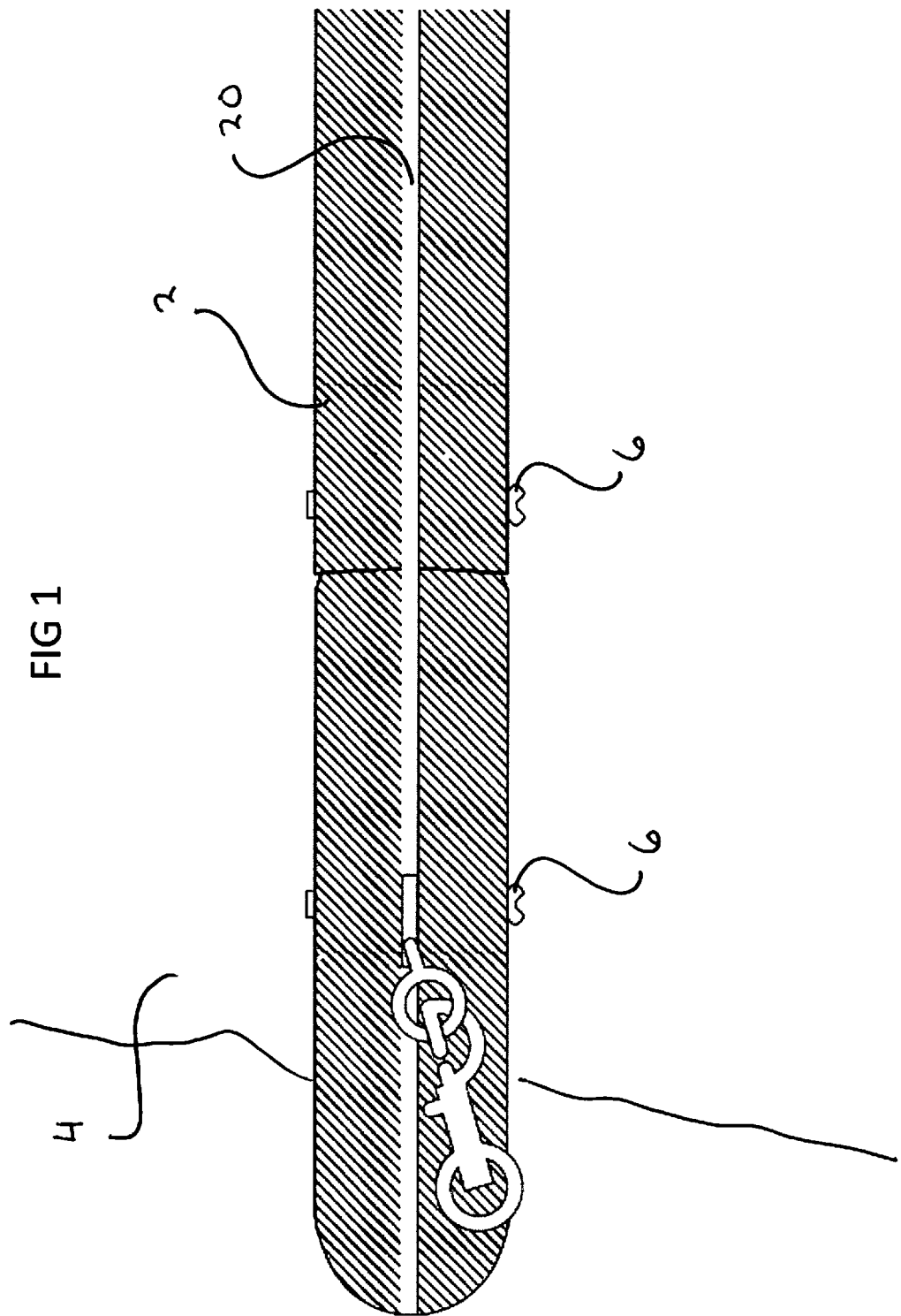
FIG. 1 is a partial side view of the portable pen run installed on a tree.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment. It will be apparent to one skilled in the art, however, that other embodiments of the present invention may be practiced without some of these specific details. It should be appreciated that the features described with respect to the disclosed embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for a lightweight, portable circular dog run that is adapted for quick and simple attachment to a plethora of different diameter vertical stanchions including but not limited to posts, trees, pillars, poles and the like.

Looking at FIG. 1 it can be seen that the portable pet run 2 ("run") when in use, is placed around a vertical stanchion 4, (illustrated herein as a tree) where the run's inner diameter is sized for frictional engagement about the outer surface of the stanchion 4 and then the distal and proximal ends of the run constrained by at least one mechanical fastener 6 passing there through. When the run 2 is formed into a circle there is a continual circular inner track 8 (FIG. 3) created that the lead anchor 10 (FIGS. 3 and 4) may freely travel in a clockwise or counterclockwise direction. The lead anchor 10 is connected to the pet's lead/leash 14 which may optionally be extendable. (FIG. 13) and since the there is a direct line at all times between the pet and the run as the pet moves about, there can be no tangling of the pet's lead/leash 14.

Figure 2:
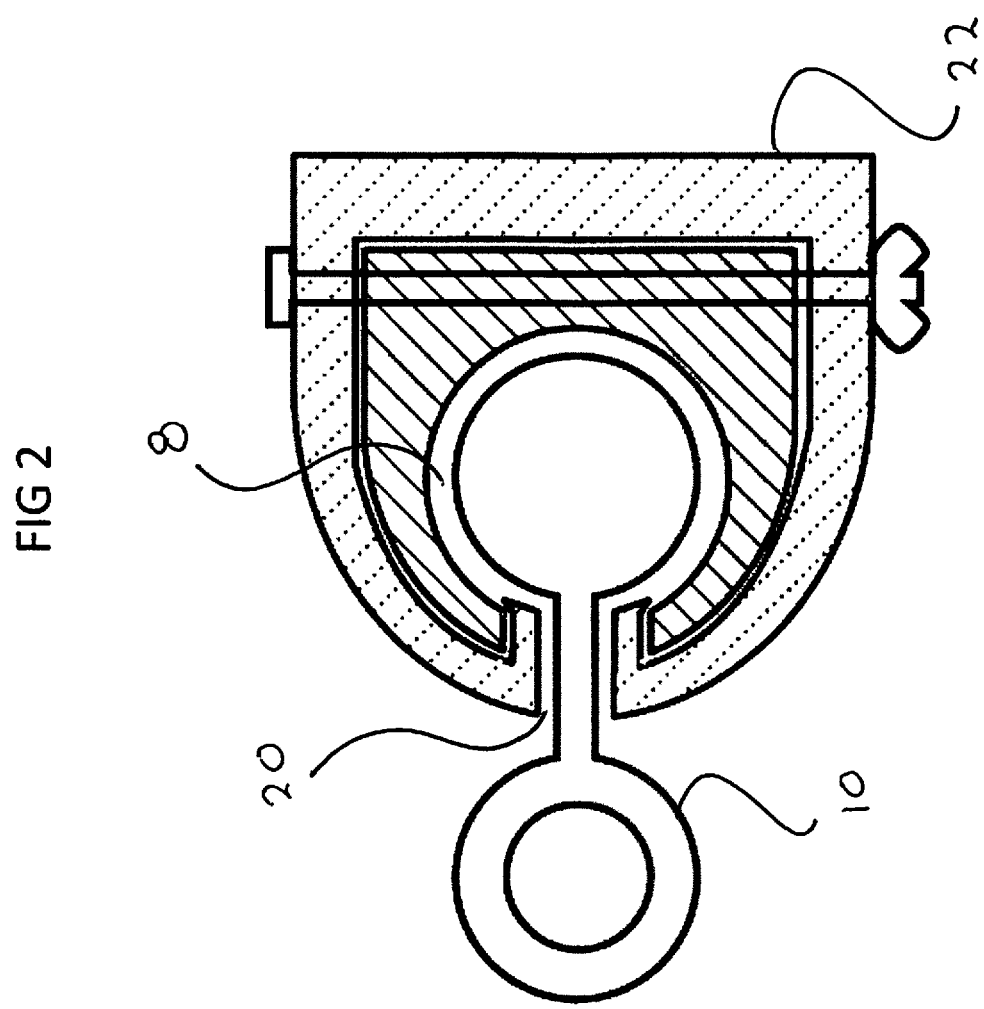
FIG. 2 is an axial cross sectional view of the portable pen run.
Figure 3:
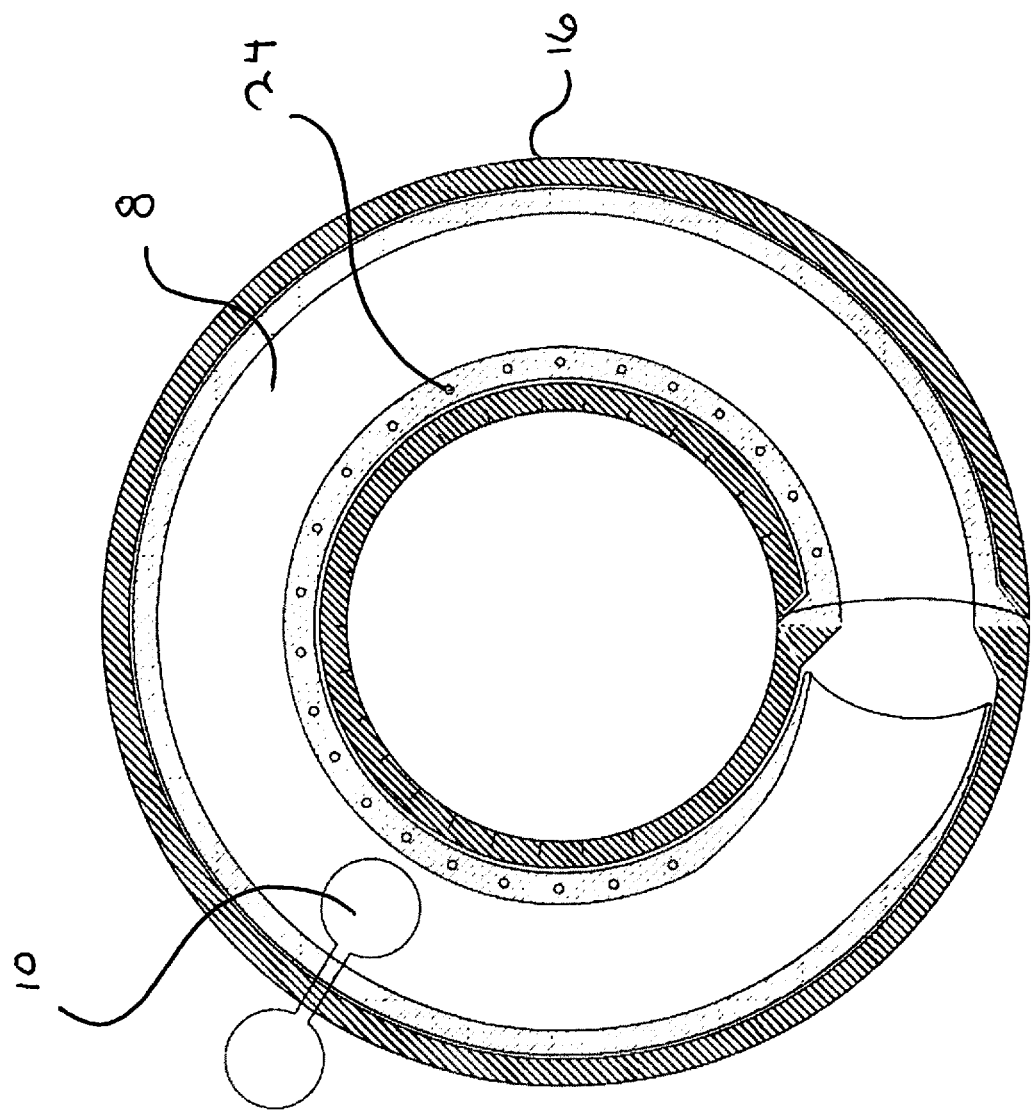
FIG. 3 is a top longitudinal cross sectional view of the portable pet run.
Figure 9:
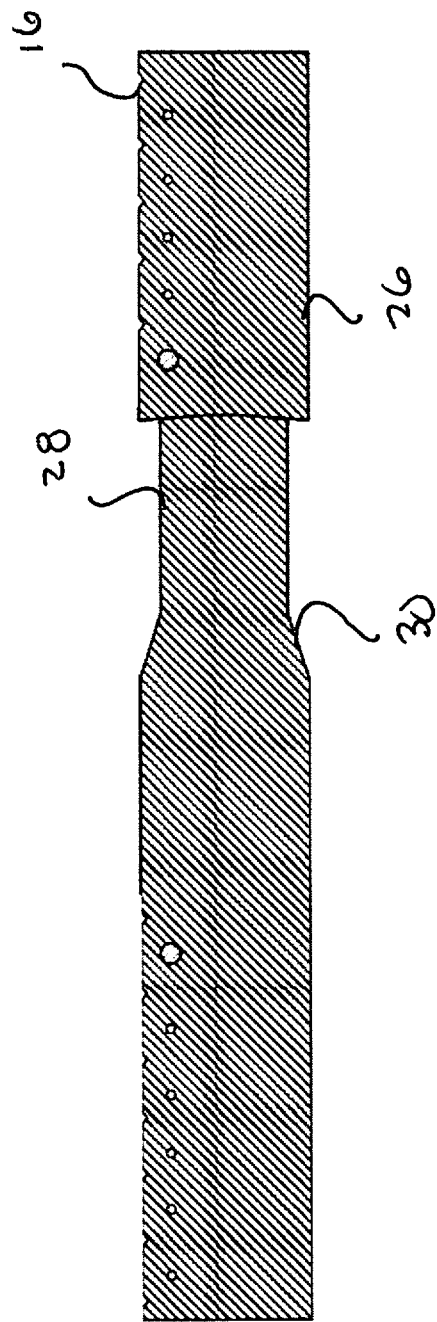
FIG. 9 is a partial top view of the portable pet run partially inserted across the connection region.
Figure 10:
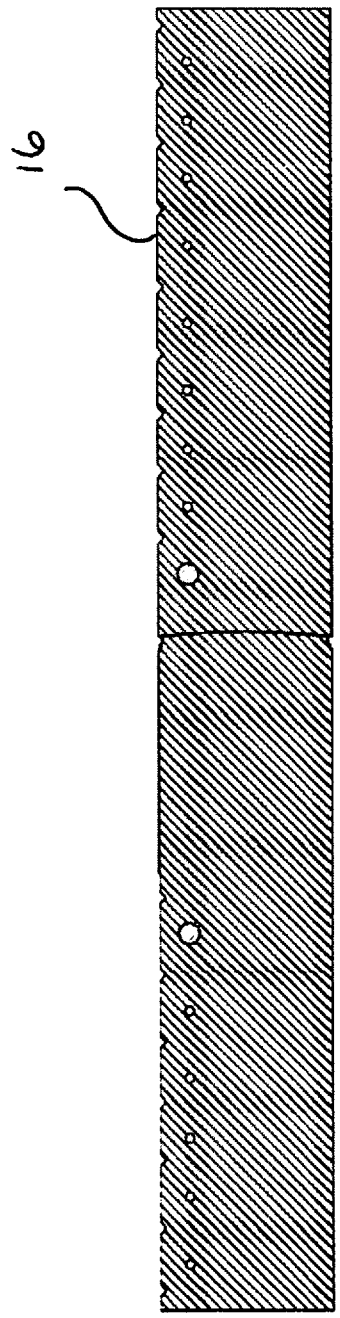
FIG. 10 is a partial top view of the portable pet run fully inserted across the connection region.
Figure 12:
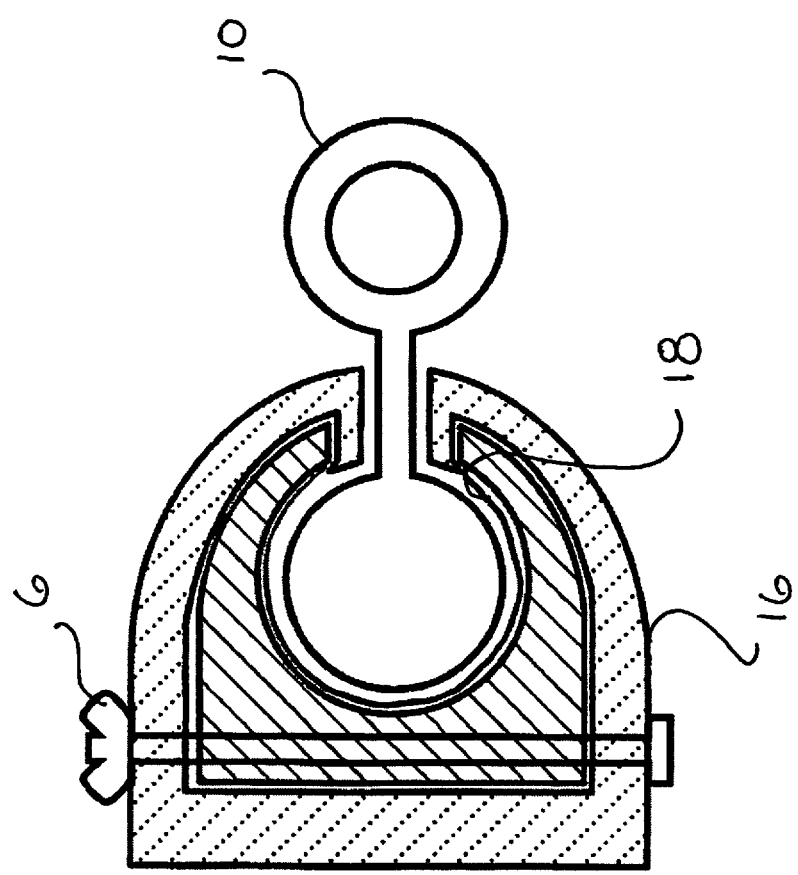
FIG. 12 is an axial cross sectional view of an alternate embodiment portable pen run.

Looking at the axial side cross section view of FIG. 2 and the top cross section of FIG. 3, it can be seen that much of the novelty of the run 2 is its simple mechanical design having only three parts: a tubular ball chase 16 (FIGS. 6, 9 and 10), a lead anchor 10 (FIG. 4), and at least one mechanical fastener 6. (FIG. 5) In the alternate embodiment there may be an additional inner sleeve 18. (FIG. 12) The inner sleeve also has a second continuous side slit formed there along, that matches the sizing of the side slit 20 formed through the outer face of tubular ball chase 16 (FIGS. 1 and 6). The outer face of said inner sleeve is frictionally engageable within the inner face of said ball chase 16.

The ball chase 16 is preferably fabricated from a flexible, lightweight, durable, resilient, elastically deformable, polymer. In its native shape, with its distal and proximal ends unconnected, it is a flexible D shaped cylindrical tube. Once its proximal end 26 and its distal end 28 are connected, the ball chase has a toroidal configuration with a D shaped cross section as is best understood with reference to FIGS. 3 and 12. However, it is known that other cross-sectional profiles may be utilized such as circular, octagonal, hexagonal and the like. The reason that a D shape configuration was utilized was because this shape provides the greatest amount of contact surface area at the back face of the device to frictionally engage the tree or stanchion.

Figure 8:
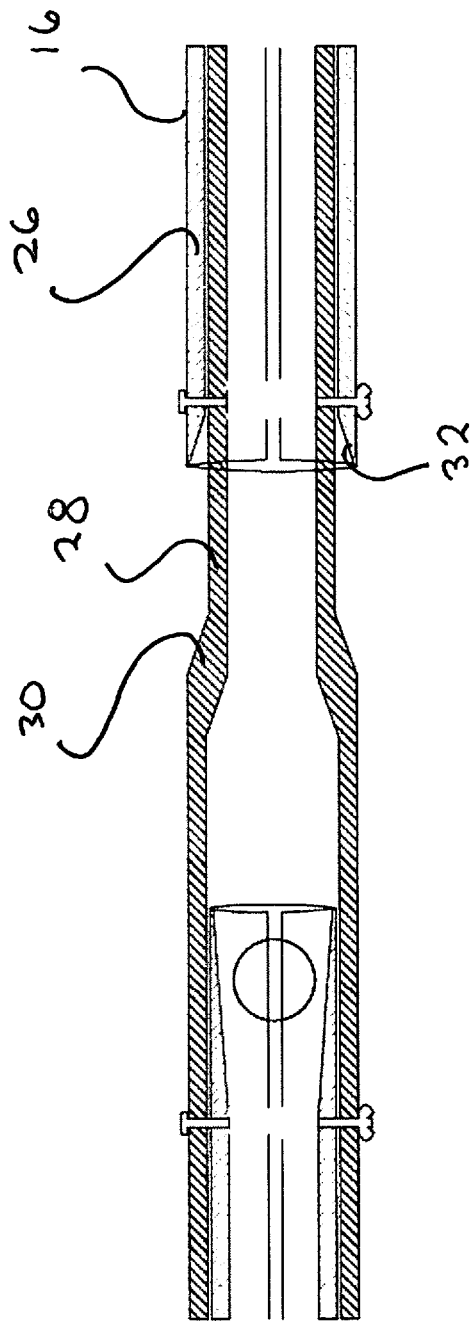
FIG. 8 is a is a cross sectional, partial front side view of the fully inserted portable pet run across the connection region.
Figure 11:
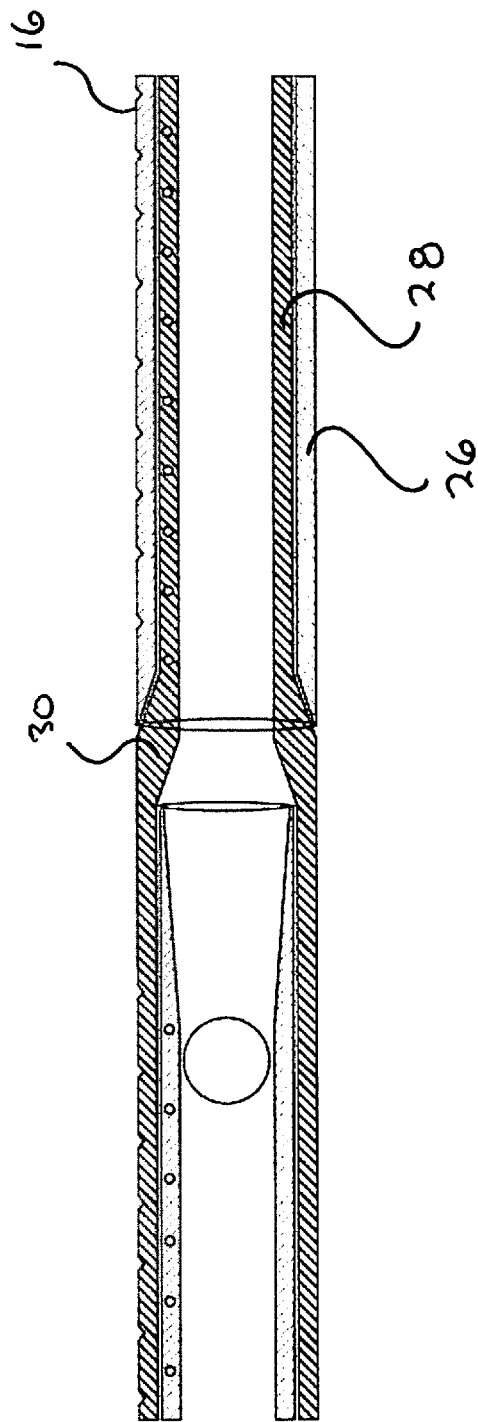
FIG. 11 is a partial top cross sectional view of the portable pet run fully inserted across the connection region.

The ball chase 16 has a central bore running through its entire length that forms continual circular inner track 8. (FIG. 2) It has a continuous side slit 20 formed there through its side wall, running along its front (non stanchion engaging) face, and a flat face 22 formed along its back face. There are two align able, matingly spaced series of through orifices 24 formed at the distal and proximal ends of the ball chase 16. (FIG. 3) These orifices 24 are formed in the thickest, back section of the side wall adjacent and parallel to the back, flat face 22 that defines the D shape of the ballchase 16. These orifices 24 are sized for the passage of the mechanical fasteners 6 there through. In this way when the distal end 28 is inserted into the proximal end 26 and the different spaced series of through orifices aligned, a mechanical fastener 6 can connect the ball chase 16 in a circle. (FIGS. 8 and 11)

The ball chase 16 has a first, inner diameter sized proximal end 26, and a smaller, second outer diameter distal (insertable) end 28 that is sized for mating insertion into the proximal end 26. When the distal and proximal ends of the ball chase 16 are engaged (as they would be in use around a stanchion 4, as seen in FIGS. 2, 3, 7, 8, 9, 11) a toroid with a D shaped cross section is formed with a front side slit 20 and a back flat face 22. Between the distal and proximal end is first transition region 30 (FIGS. 7-9 and 11), where the outer diameter as well as the inner diameter walls of the ball chase 16 are reduced.

At the first transition region 30 and continuing until the termination of the distal end, the outer diameter of the ball chase 16 is tapered to a diameter less than the inner diameter of the second transition region of the proximal end of the ball chase 16. The inner diameter of the ball chase 16 in this first transition region may reduce slightly or may remain the same as the rest of the ball chase 16. The difference results in two embodiments with different thicknesses of the side wall of the ball chase 16. Either embodiment's configuration is acceptable although in the preferred embodiment (FIG. 3) the thickness of the side wall is reduced but not until a point along the remainder of the distal length of the ball chase 16, toward the termination of the distal end 28, where there is an internal mating transitional taper 32 in the proximal end 26. (FIG. 8)

The first transition region 30 occurs at the approximate middle of the length of the ball chase 16 and its reduced outer diameter extends to the distal end 28. In this way the distal end 28 of the ball chase 16 can be inserted at variable depths into the proximal end 26 of the ball chase 16 up to approximately one half of the overall length of the ball chase 16, so as to accommodate a plethora of different diameter stanchions 4.

There is a second transition region 32 that occurs at the opening of the inner end of the proximal end of the ball chase 16. This second transition region has an internal taper that is compatible with the external taper of the first transition region to allow the insertion of the distal end of the ball track 16 therein. This also prevents the deformation of the thinner walled area of the ball chase from the transition region 30 to the distal end.

The lead anchor 10 has a lead ring 40 with a central orifice 50 joined to a polished or smooth track sphere 42 by a linear connecting member 44. The diameter of the linear connecting member 44 is less than the width of the side slit 20. It is to be noted that the inner diameter of the ball chase 16 whether at the distal end, the proximal end or the middle of the ball chase 16 accommodates the sliding movement of the track sphere 42 of the lead anchor 10 within the ball chase 16, as the inner diameter of the ball chase 16 at all points is slightly larger than the diameter of the track sphere 42.

The ball chase's exterior surface will preferably be of a matte or rough finish to enhance the frictional engagement with the stanchion 4. The inner surface will be of a smoother finish possibly with a surface treatment to decrease the sliding friction between it and the lead anchor 10. In the alternate embodiment of FIG. 12, a smooth walled, thin inner sleeve 18 with a low coefficient of friction will be inserted adjacent, applied or affixed onto the inner face of the ball chase 16. This inner sleeve 18 will be the sliding surface the track sphere 42 will run around. This inner sleeve 18 may be replaceable to accommodate wear. The mechanical fastener 6 used may be any of a plethora of common mechanical fasteners well known in the industry, including but not limited to bolts, pins, devises, rings and functionally equivalent structures. In the preferred embodiment the mechanical fastener 6 will be a threaded bolt and wing nut combination.

When the track sphere 42 of the lead anchor 10 is inserted into the ball chase 16 the linear connecting member 44 extends through the side slit 20 so as to have the lead ring 42 reside about the outside of the ball chase 16. In this way the pet's lead/leash can be connected outside the ball chase 16. As the pet moves around the stanchion 4 there is friction developed between the track sphere 41 and the inner wall of the ball chase 16. To have this lead anchor 10 rotate as freely as possible around the inside of the ball chase 16 a lubricant may be added. Water or an oil are excellent choices for this lubrication.

FIG. 13 is a perspective view of an optional elastic "bungee" or "shock cord" leash. This would replace the conventional lead used between the animal and the central orifice 50 of the lead ring 40. This would provide the animal a great range of travel and minimize the tangling of the leash.

In the assembled configuration, the ball chase's distal end is inserted into the ball chase's proximal end at a depth that draws the flat back side of the ball chase 16 into frictional engagement with the outer surface of a stanchion 4. The pet's leash is coupled to the central orifice 50 of the lead ring 40. The pet is now free to traverse about the stanchion 4, pulling the track sphere 42 of the of the lead anchor 10 in a clockwise or counter clockwise direction around the continuous inner track of the ball chase 16.

While certain features and aspects have been described with respect to exemplary embodiments, one skilled in the art will recognize that numerous modifications are possible. Similarly, while certain functionality is ascribed to certain system components, unless the context dictates otherwise, this functionality can be distributed among various other system components in accordance with the several embodiments.

Moreover, system components described according to a particular structural architecture may be organized in alternative structural architectures and/or incorporated within other described devices. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although only one exemplary embodiment is described above, it will be appreciated that the invention is intended to cover all modifications and equivalents within the scope of the following claims.

The invention claimed is:

1. A portable pet run comprising:
a toroidal ball chase with a D-shaped cross section with a flat faced back side, said ball chase having a circular bore centrally formed along its length, a side slit formed along its length, a proximal end and a distal end;
a lead anchor having a spherical end and a ring end with a central orifice, said ring end and said spherical end being separated by a linear connecting member said spherical end and said ring end joined by a said linear connecting member;
a series of matingly spaced and sized orifices formed there through said both distal end and proximal ends of said ball chase, wherein at least one of a mechanical fastener passes through said orifices in said proximal end and said distal end of said ball chase; wherein
said distal end of said ball chase is inserted into said proximal end of said ball chase and constrained therein by said mechanical fastener passing therethrough, and said spherical end of said lead anchor resides within said circular bore and said ring end extends through said side slit.

2. The portable pet run of claim 1 further comprising:
a first transition region formed between said proximal end and said distal end of said ball chase, said first transitional region having an outer diameter tapered to less than an inner diameter of said proximal end of said ball chase and extending to said distal end of said ball chase.

3. The portable pet run of claim 2 further comprising:
a second transition region formed at the proximal end of said ball chase having an internal taper compatible with said tapered outer diameter of said first transition region so as to allow the insertion of said distal end of ball track therein.

4. The portable pet run of claim 3 further comprising:
an inner sleeve with a second side slit formed there along, said second side slit matching a size of said first side slit and wherein an outer face of said inner sleeve is frictionally engageable within an inner face of said ball chase.

5. The portable pet run of claim 4 wherein said ball chase is made of a polymer.

6. The portable pet run of claim 5 further comprising a leash said leash connectable to said ring end of said lead anchor.

7. The portable pet run of claim 6 wherein said leash is made of an elastically extendable material.

* * * * *